United States Patent
Rhodes

(10) Patent No.: US 6,827,200 B1
(45) Date of Patent: Dec. 7, 2004

(54) MULTI-SPEED VARIABLE SPACING CONVEYOR SYSTEM

(76) Inventor: Arthur B. Rhodes, 901 Bean Rd., Sellersburg, IN (US) 47172

(*) Notice: Subject to any disclaimer, the term of this patent is extended or adjusted under 35 U.S.C. 154(b) by 0 days.

(21) Appl. No.: 10/352,598

(22) Filed: Jan. 28, 2003

Related U.S. Application Data

(60) Provisional application No. 60/353,420, filed on Feb. 1, 2002.

(51) Int. Cl.[7] .................. B65G 17/32; B65G 17/20; B65G 37/00; B65G 43/08; B65G 47/34
(52) U.S. Cl. .................. 198/680; 198/465.4; 198/678.1
(58) Field of Search .................. 198/680, 678.1, 198/465.4, 486.1

(56) References Cited

U.S. PATENT DOCUMENTS

| | | |
|---|---|---|
| 3,384,097 A | 5/1968 | Meeker et al. |
| 4,147,265 A | 4/1979 | McGill et al. |
| 4,757,893 A | 7/1988 | Shabram, Jr. et al. |
| 4,838,036 A | 6/1989 | Norrie |
| 5,000,309 A | 3/1991 | Dooley |
| 5,078,262 A | 1/1992 | Grube et al. |
| 5,226,525 A | 7/1993 | Dooley |
| 5,253,742 A | 10/1993 | Dooley |
| 5,261,520 A | 11/1993 | Duke |
| 5,303,815 A | 4/1994 | Dooley |
| 5,566,815 A | 10/1996 | Dooley |
| 5,806,657 A * | 9/1998 | Enderlein et al. ........... 198/680 |
| 5,919,023 A | 7/1999 | Owens, Jr. |
| 6,199,682 B1 * | 3/2001 | Matkovich ............... 198/465.4 |
| 6,209,710 B1 | 4/2001 | Mueller et al. |
| 6,415,907 B1 * | 7/2002 | Matkovich ............... 198/465.4 |

* cited by examiner

Primary Examiner—Gene O. Crawford
(74) Attorney, Agent, or Firm—Charles G. Lamb; Middleton & Reutlinger

(57) ABSTRACT

A multi-speed variable spacing conveyor system is shown and described herein having at least a first conveyor operating at a first speed and having a plurality of workpiece carriers thereon in a first spaced configuration. Operably communicating with the first conveyor is at least a second conveyor operating at a second speed. Between the at least first conveyor track and the at least second conveyor track is a transfer mechanism, which allows movement of workpiece carriers therebetween. The second conveyor operating at the second speed allows a second spaced configuration of the workpiece carriers. When disposed in the second spaced configuration, less conveyor track is necessary to hold and move a number of carriers through an inclined and declined portion of conveyor track, as well as a through a workstation resulting in less manufacturing and operating costs.

20 Claims, 5 Drawing Sheets

FIG. 1
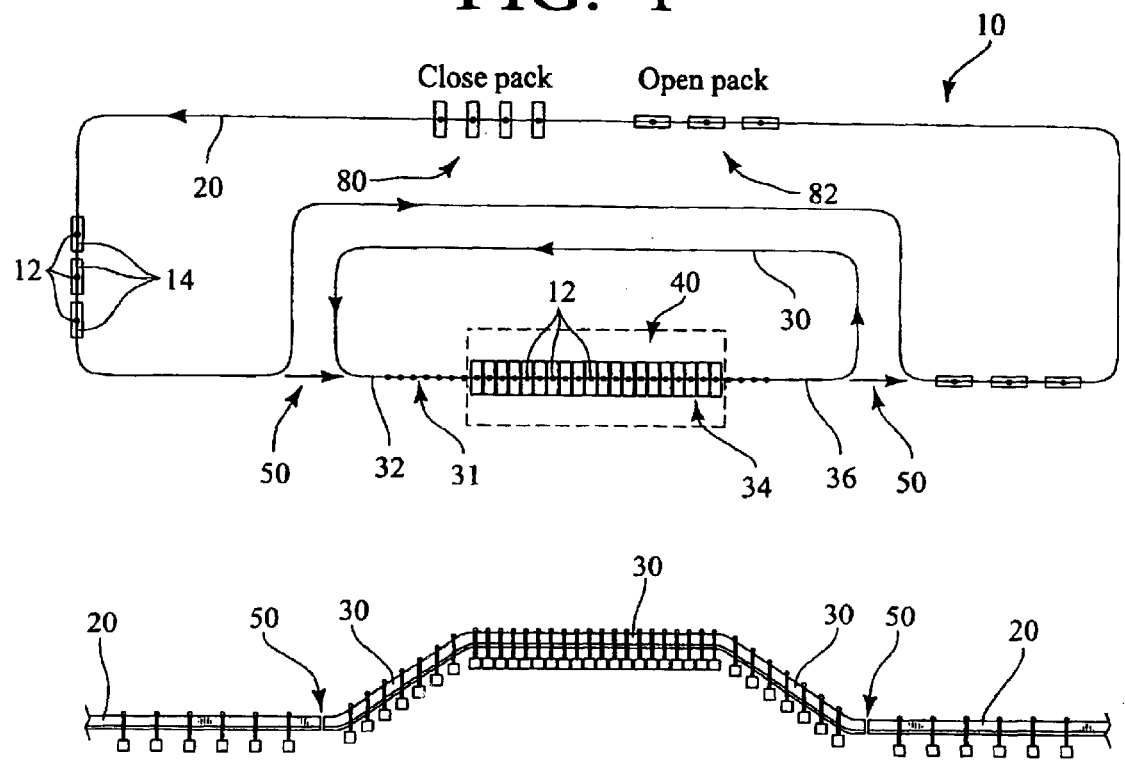
FIG. 2
FIG. 6
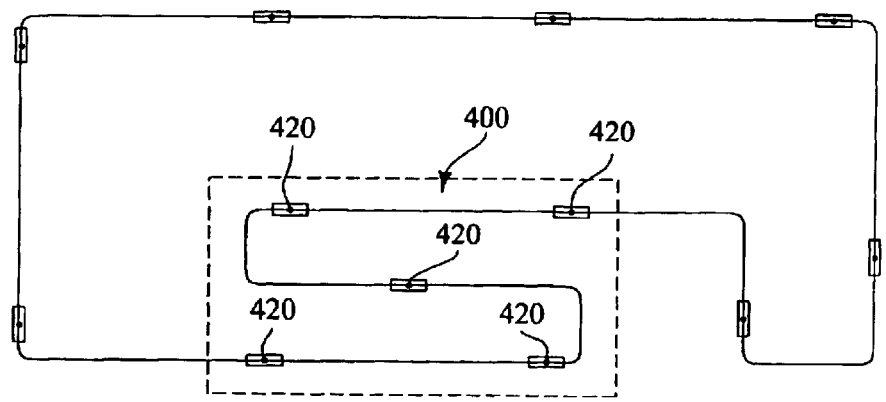

MULTI-SPEED VARIABLE SPACING CONVEYOR SYSTEM

This is a utility patent application claiming priority to U.S. Provisional Patent Application No. 60/353,420, filed Feb. 1, 2002.

BACKGROUND OF THE INVENTION

1. Technical Field of the Invention

The present invention relates to an overhead conveyor system, and more particularly to a system of at least two overhead conveyors wherein a first conveyor having a plurality of workpiece carriers disposed thereon and operating at a first speed transfers workpiece carriers to a second conveyor operating at a second speed and into a closepack configuration.

2. Description of the Related Art

Conveying systems are typically used in manufacturing facilities to move work pieces from station to station along a predetermined path. Current conveyors may be used to transport elongated pieces such as furniture, doors, and the like through paint booths, curing ovens, and other workstations. These conveyors may be chain driven and have rotatable workpiece carriers.

Rotatable workpiece carriers are preferable for use with elongated workpieces because the workpieces can be rotated through a plurality of positions along a conveyor path, as desired. For instance, a rotating carrier may carry a relatively long piece of wood or fiberglass, having a length of five feet (5'). If the axis of the elongated piece travels parallel to the axis of the conveyor, the carriers would preferably be traveling on center distances of at least five feet (5'). This is called an openpack configuration. However, the elongated workpiece may be rotated ninety degrees so that its axis is transverse to the conveyor path. This is known as a closepack configuration. To conserve space and conveyor materials, it is desirable to shorten the distance between carriers, i.e. the center distance, in the closepack configuration, especially through inclines, declines, and selected workstations. A closepack configuration with shortened center distance is desirable because shorter lengths of conveyor track can be used and less overall manufacturing area is required for the manufacturing process. Therefore, a means for adjusting the center distance between workpiece carriers is needed to fully take advantage of the closepack configuration.

Typically on a single chain conveyor system including a plurality of workpiece carriers, the distances between carriers can be changed if the carriers are on a level portion of conveyor. In one type of conveying system a workpiece carrier having chain engaging pin is disengaged from a conveyor chain by bumping an engaged carrier into a previously stopped or disengaged carrier. An uncoupling bar or disengaging mechanism located on a front portion of the carrier contacts the rear of the disengaged cart and the mechanical linkage causes the carrier pin to raise or release from the conveyor chain. However, the distance between carriers cannot be changed while the carriers are moving along an inclined portion because disengaging the carrier pins on an incline will result in the carrier rolling backward along the conveyor path. In addition, changing the distance between workpiece carriers may require stopping an entire conveyor line if the carriers are all operating on a single chain. Thus, the result is that longer lengths of conveyor track are required to move through inclines and declines.

It is preferable to move the carriers into a closepack configuration with shorter distances between the centers of carriers when moving the carriers for instance through a paint booth, curing oven, drier, or the like without decreasing the throughput of workpieces. In a closepack configuration, carriers travel at relatively slower speeds than when in an openpack configuration. In addition smaller booths, ovens, or workstations are necessary thereby reducing manufacturing costs by, for instance, reducing building costs of the booths or ovens, heat loss, and ventilation equipment costs. Many overhead carriers move through an inclined or declined portion immediately prior to entering a paint booth, curing oven, or drier. Therefore a current problem exists as to positioning the carriers in a closepack configuration with shortened distances between the centers of the carriers when the carriers are moving through an inclined or declined position near a paint booth, curing oven, drier, or other type of workstation. In view of the deficiencies of known conveyor systems it is apparent that a system is needed for closepacking workpiece carriers in a manner wherein the center distance between the workpiece carriers is decreased therefore requiring less horizontal distance and conveyor length for conveyor inclines, declines, paint booths, baking ovens, dryers, or other workstations.

SUMMARY OF THE INVENTION

It is an objective of this invention to provide an overhead conveyor which allows closepacking of carriers along a flat, inclined, or declined portion of a conveyor system;

It is an even further objective of the present invention to provide a first conveyor moving at a first speed and a second conveyor moving at a second speed through an incline, a decline, and/or a work station;

It is yet an even further objective of the present invention to provide a conveyor system having a plurality of workpiece carriers in a first spaced configuration and a second, more closely spaced configuration.

It is still an even further objective of the present invention to provide a transfer unit for moving a plurality of workpiece carriers from a first conveyor to a second conveyor operating at a second speed.

Specifically, a multi-speed variable spacing conveyor system is provided which includes:

a first chain driven conveyor track for conveying a plurality of workpiece carriers therealong;

a second chain driven conveyor track wherein the track is for conveying a plurality of workpiece carriers therealong; and, a transfer mechanism disposed between the first conveyor track and the second conveyor track for moving a plurality of carriers from the first conveyor track to the second conveyor track.

More specifically a method of transporting a workpiece carrier from a first conveyor to a second conveyor including the steps of:

operating a first conveyor at a first speed;

operating a second conveyor at a second speed;

operating a transfer mechanism at a speed equal to at least the first conveyor;

engaging a workpiece carrier along the first conveyor;

disengaging the workpiece carrier from the first conveyor;

forcing the workpiece carrier across the transfer mechanism to the second conveyor; and, engaging the workpiece carrier with the second conveyor.

All of the above outlined objectives are to be understood as exemplary only and many more objectives of the invention may be gleaned from the disclosure herein. Therefore, no limiting interpretation of the objectives noted are to be understood without further reading of the entire specification, claims, and drawings included herewith.

BRIEF DESCRIPTION OF THE DRAWINGS

The aspects and advantages of the present invention will be better understood when the detailed description of the preferred embodiment is taken in conjunction with the accompanying drawings, in which:

FIG. 1 is a schematic of a plan view of a conveyor system of the present invention;

FIG. 2 is a schematic of a side view of the conveyor system of FIG. 1;

DETAILED DESCRIPTION OF THE PREFERRED EMBODIMENT

Multiple Speed System

Figure 4:
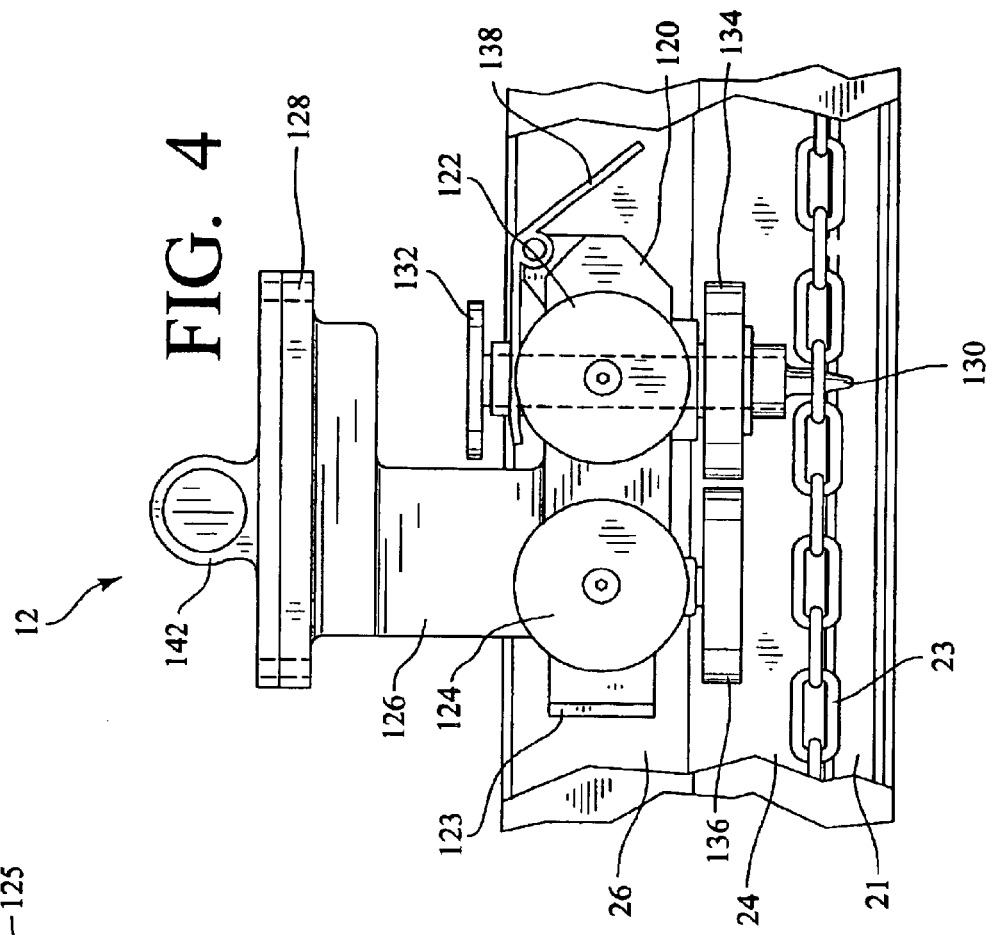
FIG. 4 is a side view of FIG. 3 with selected portions shown cut-away and the load arm removed.
Figure 3:
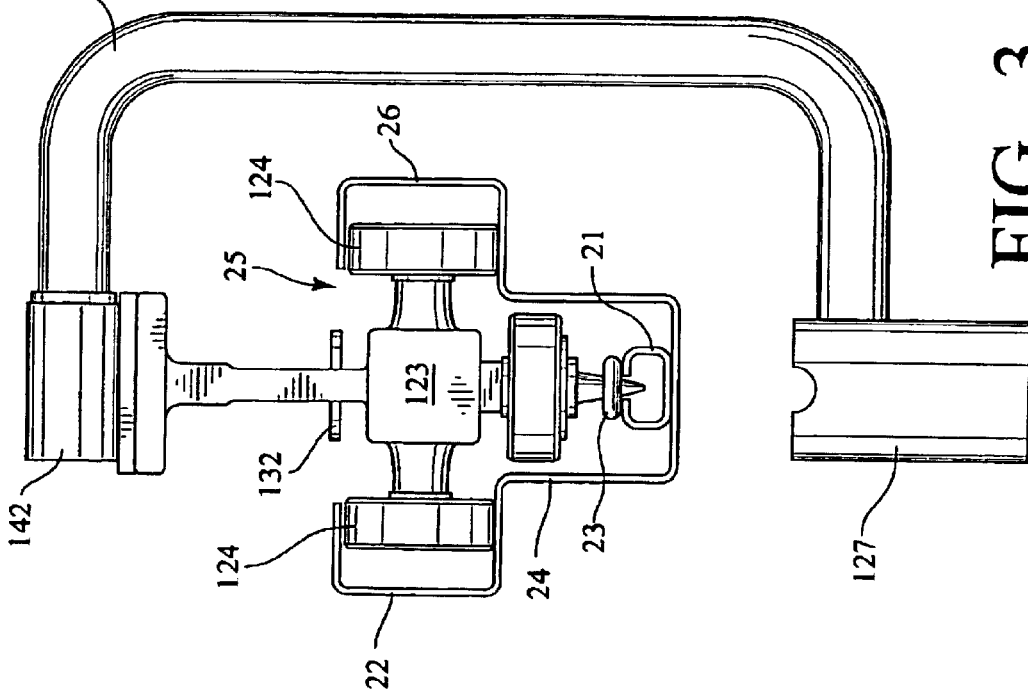
FIG. 3 is an end view of a workpiece carrier in a conveyor track of the present invention.

Referring initially to FIGS. 1–3, a multi-speed variable spacing conveyor system 10 is shown having a first conveyor 20. The first conveyor 20 may be an overhead conveyor having a substantially T-shaped cross-section formed by three U-shaped channels 22, 24, 26, with an upper open portion 25 such as is shown in FIG. 3. Within the lower channel 24 is a substantially square chain channel 21 having an opening in an upper surface. Partially seated within chain channel 21 is a chain 23, which pulls a workpiece carrier 12 along the first conveyor 20, as best seen in FIG. 4. The workpiece carrier 12 is shown in FIG. 4 without the load arm 125, shown in FIG. 3, for reasons of clarity. The chain 23 is operably connected to a chain drive system (not shown), which may comprise at least a motor, a drive shaft, and a sprocket. The drive system preferably drives the chain 23 at a speed that is dictated by the manufacturing process. The chain 23 is preferably a log chain sized to allow incremental adjustment of a carrier pin about every 2½". The variable spacing conveyor system 10 may have straight, curved, inclined, and declined portions and with a path moving through various workstations 40, for example a paint booth, curing oven, dryer, cleaning station, or the like.

Figure 5A:
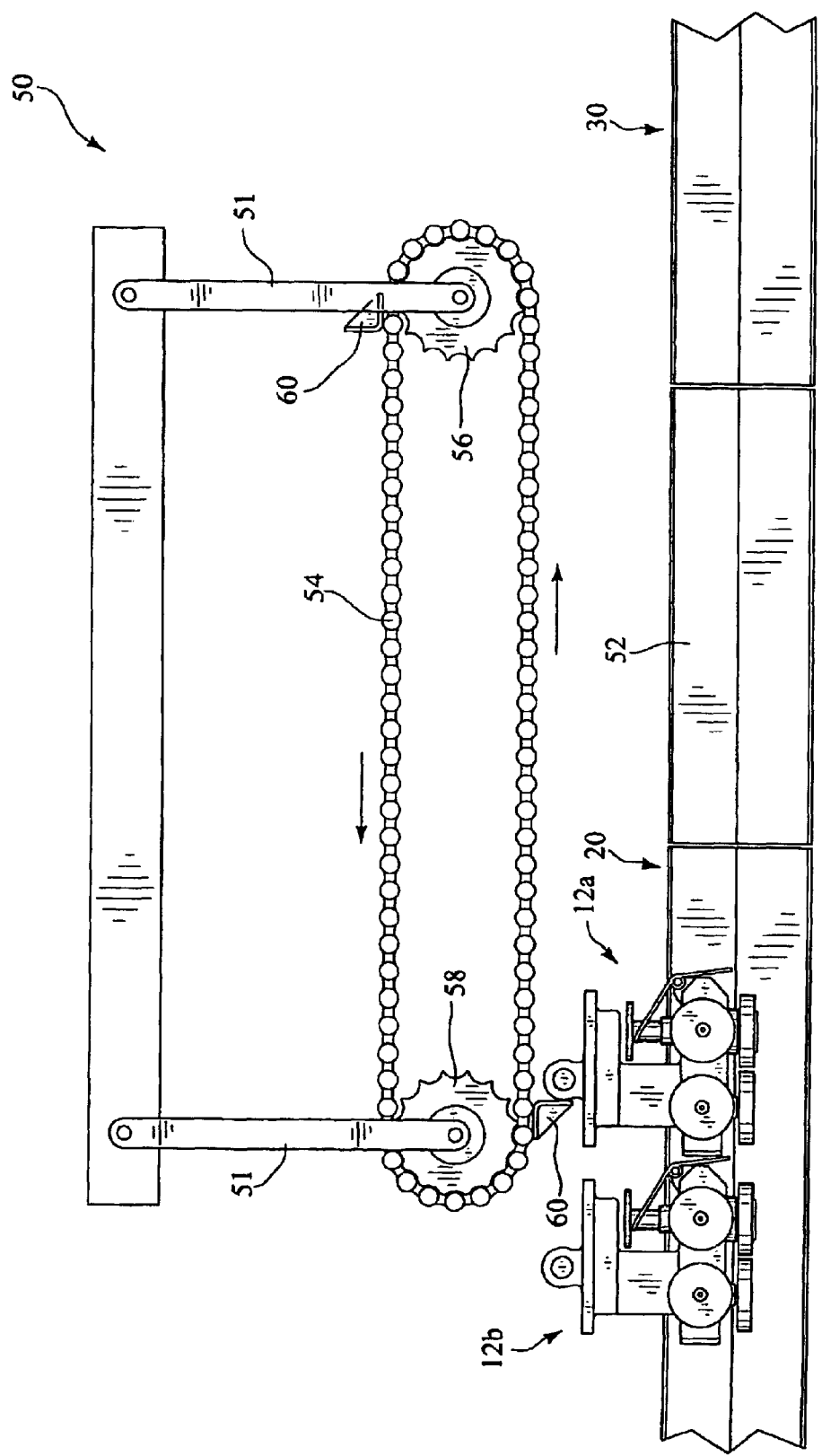
FIGS. 5A, 5B, and 5C show the sequence of events in transferring a carrier from a first conveyor track to a second conveyor track; and, FIG. 6 shows a schematic of a plan view of a prior art conveyor system.
Figure 5B:
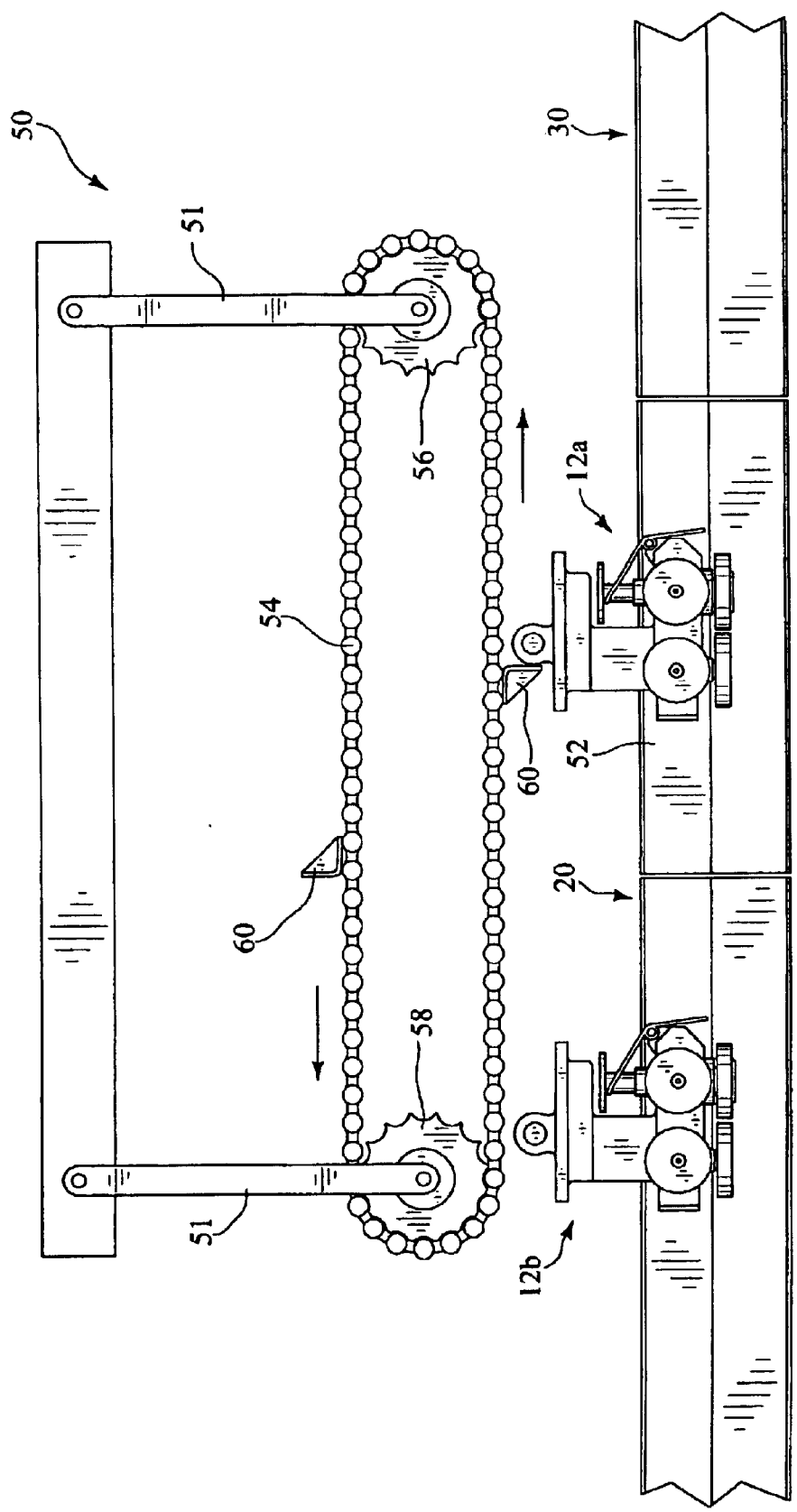
Figure 5C:
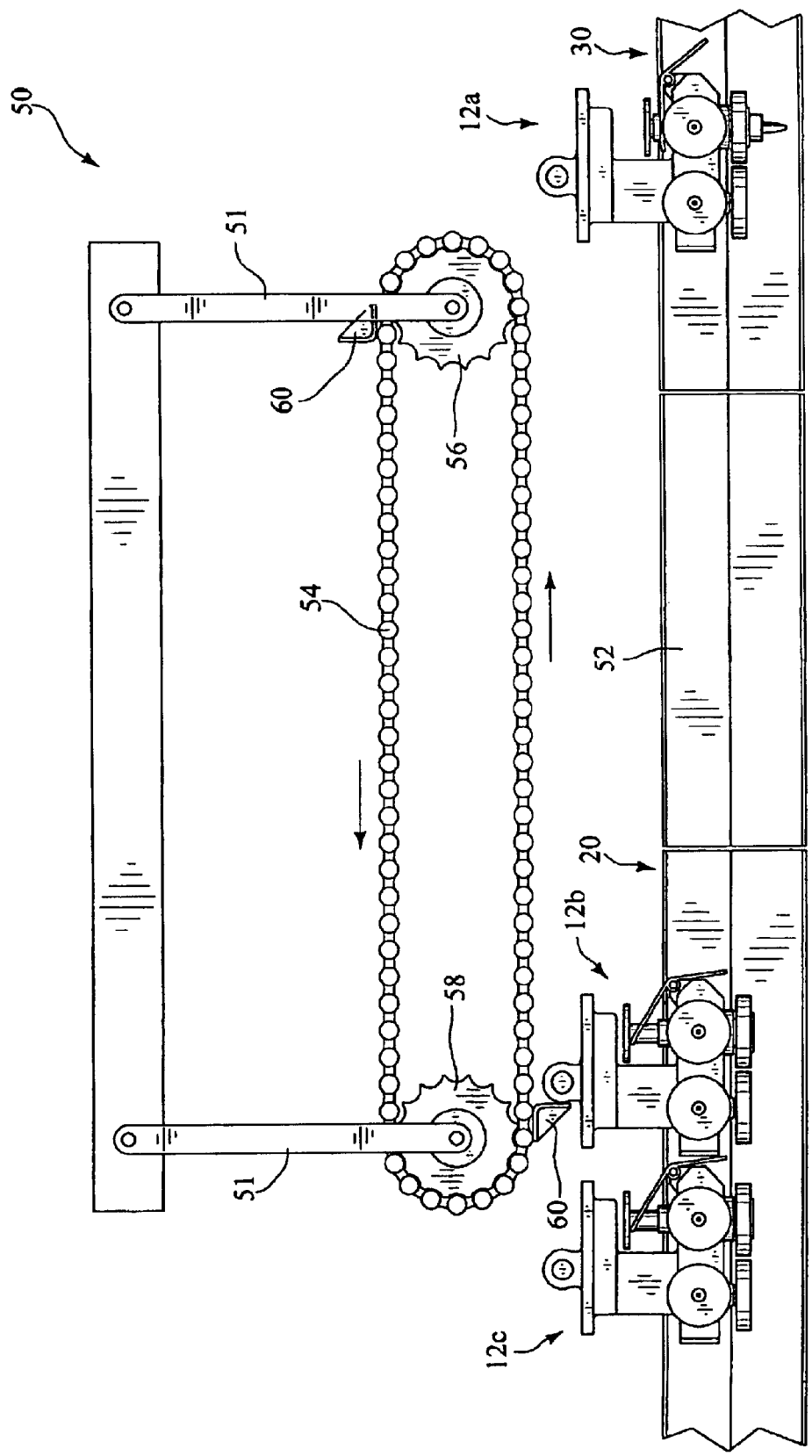

A second conveyor 30 is also shown. The second conveyor 30 also has a substantially T-shaped cross section formed of three substantially U-shaped channels 22,24,26 with an upper open portion 25. As with the first conveyor 20, a chain channel 21, and chain 23 are positioned within the second conveyor 30. Connecting the first conveyor 20 and the second conveyor 30 is a transfer device 50, as shown in FIGS. 5A, 5B, 5C. The transfer device 50 moves a workpiece carrier 12, such as shown in FIG. 4, between the first and the second conveyors 20,30 respectively. The workpiece carriers 12 are shown in FIGS. 5A–5C without the load arm 125, shown in FIG. 3, for reasons of clarity. A plurality of path designs may be formed using conveyors 20,30 or additional conveyors if necessary. However, for reasons of simplicity, two conveyors 20,30 are shown having a generally continuous rectangular shaped path for the workpiece carriers 12.

The workpiece carriers 12 shown in FIGS. 1, 2, 4 and 5 generally travel within the substantially T-shaped first and second conveyors 20,30. More specifically, the carrier 12 travels in the area formed by U-shaped channels 22,26. The partially enclosed conveyor track design provides a distinct advantage over many other forms of conveyors. Any drive lubricants from the chain, carrier, or other parts are contained within the portion of the conveyor formed by U-shaped channel 24. Therefore lubricants such as oil or grease, as well as contaminants are inhibited from contacting the workpiece 14 beneath carrier 12.

The workpiece carriers 12 are generally moved along the path of conveyors 20,30 in either of two positions. In a first position, called the openpack position, the axis of workpiece 14 travels in a position substantially parallel to the axis of conveyors 20,30. The openpack configuration is shown as indicated by numeral 82 in FIG. 1. Thus, when elongated workpieces are used, a longer center distance is required between workpieces. The center distance is defined, for purpose of this invention, as the distance from a midpoint or center of a first carrier to a midpoint or center of an immediately adjacent second carrier. In a second position, the axis of the workpiece 14 is transverse to the axis of the conveyor 20,30 or rotated by about 90 degrees from the openpack position. This position is called the closepack position and is preferable when space is a concern such as when moving through an incline, decline, paint booth, curing oven, dryer, or the like. The closepack configuration is indicated by the numeral 80 in FIG. 1. The workpiece 14 may be rotated in any manner such as that taught in U.S. patent application Ser. No. 09/799,370 and incorporated herein by reference. However, rotating a workpiece by about ninety degrees into a closepack position does not necessarily save space alone. It is also preferable that the distance between workpiece carriers 12 be decreased thereby decreasing the length of conveyor needed to move through, for instance, a workstation 40.

In a preferred embodiment of the invention, the first conveyor 20 is shown having a substantially U-shaped path. However, the conveyor path can alternatively be any shape desired as called for by the manufacturing process or the layout of the manufacturing facility. As shown in FIG. 1, within an open area of the U-shaped path formed by conveyor 20 is the second conveyor 30 having a substantially rectangular path. The second conveyor 30 preferably has at least one side 31 in operable communication with the first conveyor 20 via transfer units 50 which will be discussed hereafter. The at least one side 31 of second conveyor 30 may have an inclined portion 32, a declined portion 36, or a substantially level portion 34 for moving through a workstation 40 such as a paint booth, curing oven, or the like. In combination, the U-shaped path of first conveyor 20 and the at least one side 31 of second conveyor 30 form a substantially rectangular path which may be exemplary of the present invention. One of ordinary skill in the art will recognize that a plurality of path designs may be formed of a plurality of conveyors to achieve a predetermined path design for a manufacturing facility.

Typically, in conveying systems a single chain may be used to pull a workpiece carrier through a predetermined path in a manufacturing facility. The center distance between adjacent workpiece carriers, for example ten feet, will remain that distance since it is very difficult to adjust the center distances along a single chain conveyor. Moreover, it is typical that a conveyor may move through an incline or decline prior to moving through a workstation. As a result, inclined and declined portions, and workstations have longer runs of conveyor track as shown in FIG. 6. It would be preferable to closepack the carriers 12 and reduce the distances between carriers through the inclined and declined portions as well as through workstations thereby reducing the horizontal distance and materials needed to dispose a conveyor through the incline or decline.

To accomplish this, the instant invention uses a rotating workpiece carrier 12 having a load arm 125 which allows a workpiece to rotate between an openpack and a closepack configuration. In addition, the multi-speed variable spacing conveyor system 10 changes the distance between the centers of workpiece carriers 12 resulting in shorter distances between the workpieces 14. In combination, the closepack configuration and shorter center distance result in shorter inclined and declined portions of conveyor track without reducing throughput of workpieces. As well, smaller workstations 40 may be constructed yet they may contain at least an equivalent number of workpieces as larger workstations having longer runs of conveyor track therethrough. This is best shown by comparing workstations 40 in FIG. 1 with workstation 400 in FIG. 6 wherein fewer carriers 420 are shown in a workstation 400 due to the spacing and openpack configuration. Utilizing smaller workstations may result in less workstation construction costs, less work station maintenance costs, less heat loss through the station, less ventilation equipment costs, and less conveyor material and construction costs.

In the multi-speed variable spacing conveyor system 10 of the present invention, the speed and center distance of first conveyor 20 is proportional to the speed and center distance of second conveyor 30. Mathematically this may be expressed as a proportion:

$$\frac{Speed_1}{Speed_2} = \frac{CD_1}{CD_2}$$

As exemplary of the present embodiment shown in FIG. 1, the first conveyor 20 may have a $speed_1$ of 20 feet per minute with workpiece carriers 12 spaced on 10 feet centers, i.e. $CD_1$. If a workstation 40 process dictates that the $speed_2$ through, for example, a curing oven is five feet per minute, then the spacing $CD_2$ will be 2.5 feet. It may, for example, be desired that $CD_2$ be 5 feet or some other measurement during the design stage of the conveying system 10. In that case the speed of the second conveyor 30 may be changed to accommodate the spacing design parameter. In addition, if the parameters of the second conveyor are preselected due to a manufacturing process then the parameters of the first conveyor may be adjusted instead.

As compared to a prior single chain conveying systems shown in FIG. 6, the instant invention has workpiece carriers 12 disposed in a closepack position having shortened distances therebetween which move through inclines, declines and workstations. This allows a larger number of workpieces to fit within a specific length of conveyor track through inclines, declines, and workstations and constitutes a major improvement over prior art designs. In the alternative, the instant invention allows at least an equal number of workpiece carriers 12 through a manufacturing facility as the prior art, however, it requires less conveyor track.

Carrier

As best shown in FIGS. 3 and 4, the workpiece carrier 12 has a frame 120 comprised preferably of cast iron but which may be any strong, lightweight, corrosion resistant material. The frame 120 may have a rectangular block shape or any shape which fits within the conveyor track design, as shown in FIG. 3. Extending from the frame 120 is an arm 126 having a load arm support platform 128. Atop the load arm support platform 128 is a lug 142 through which a load arm 125 may be disposed. The load arm 125, shown in FIG. 3, may have a substantially C-shaped design with a lower sleeve 127 for receiving a workpiece holder (not shown). Extending from the rear surface of frame 120 is a bumping plate 123. The bumping plate 123 preferably is square but may be any other desirable shape.

Extending from frame 120 side surfaces are wheels or casters 122 and 124. The wheels or casters 122 and 124 are preferably sized to fit within conveyor sections 22 and 26. Extending from the bottom surface of frame 120 are wheels 134 and 136. The wheels 134 and 136 maintain the carrier 12 in vertical alignment within the conveyor and chain 23. Extending through the frame 120 is a bore. In sliding engagement through the bore is a chain engaging pin 130 having a pin flange 132. The pin flange 132 may be circular in shape and circumscribing the pin 130. A camming lever 138 is pivotably connected to the frame 120. The camming lever 138 has a first end and a second end, the first end extends outwardly from the front of carrier 12 and the second end contacts a lower surface of the flange 132.

As the carrier 12 bumps into a previously disposed carrier the camming lever 138 is pushed inward by bumping plate 123 of the previous cart. This forces the camming lever 138 to rotate thereby raising pin 130. When the pin 130 is fully raised the carrier 12 becomes disengaged from the chain 23.

Transfer Unit

In order to move the workpiece carriers 12 at an appropriate speed from the first conveyor 20 to the second conveyor 30 a transfer unit 50 is disposed therebetween to push the carriers 12 from the first conveyor 20 to the second conveyor 30 and from the second conveyor 30 to the first conveyor 20. Since, in this exemplary embodiment, the first conveyor 20 has operating parameters of 20 feet per minute on 10 feet centers, the transfer unit 50 would need to push carriers 12 at a rate of two per minute from the first conveyor 20 to the second conveyor 30. This rate of movement across transfer unit 50 results in the spacing $CD_2$ of 2.5 feet between carriers 12. One of ordinary skill in the art will recognize that the transfer unit 50 should operate at a speed at least equal to that of the feed conveyor.

The transfer unit 50 is comprised of a transfer track 52 spanning a gap between at least the first conveyor 20 and the second conveyor 30. The transfer track 52 has a preferably T-shaped cross section and may be formed of three U-shaped channels such as shown in FIG. 3. However, the transfer track 52 does not have a chain channel, such as chain channel 21 described above and shown in FIG. 3, because the carriers 12 which move across the transfer track 52 will be pushed across instead of being pulled by chain 23. The transfer track 52 is positioned to allow travel of the carrier 12 between at least the first conveyor 20 and the second conveyor 30.

Positioned preferably above the transfer track 52 is a structural steel support 51 from which the transfer track 52 depends and from which the transfer track 52 may rotate to guide the carrier 12 to a plurality of conveyor tracks. Depending from the structural steel support 51 is a crossover chain 54 which is part of a drive system comprising preferably a motor and a drive shaft (not shown) and at least two sprockets 56,58. Attached to the crossover chain 54 are a plurality of push dogs 60. Each dog 60 moves with the crossover chain 54 and contacts a sleeve 142 of the carrier 12 to push the carrier 12 across the transfer track 52. As discussed previously above the crossover chain 54 preferably operates at a speed at least equal to the speed of the feed conveyor, for instance conveyor 20.

On a second side of the transfer track 52 is a conveyor track 30 operating at a second desired speed. As previously discussed, the second speed provides a desired spacing between the carriers 12 of the instant invention. An additional transfer device 50 is positioned at an end of the second conveyor track 30 for returning workpiece carriers to the first conveyor 20.

Operation

In use, the drive systems of conveyors 20, 30, and transfer unit 50 are started. The speeds of the first and second conveyors 20,30 as well as the transfer unit 50 may be preselected due to manufacturing requirements. The carriers 12 are engaged by the carrier pin 130 to the chain 23 moving through conveyors 20,30. As shown in FIG. 5A a first carrier 12a bumping plate 123 is shown being bumped from behind by carrier 12b. As discussed above, when carrier 12b bumps carrier 12a, the camming lever 138 of carrier 12b rotates forcing pin 130 to disengage from the chain 23. This causes carrier 12b to become disengaged from the conveyor chain (not shown). That is, referring to FIG. 4, the first carrier 12a, already disengaged from the conveyor chain by mechanical, hydraulic, or pneumatic means known in the art, (not shown), is engaged by the push dog 60 which pushes carrier 12a across the transfer track 52. This is depicted in FIG. 5B. The push dog 60 pushes the carrier 12a to conveyor 30 as shown in FIG. 5C. Once carrier 12a is disposed in track 30, carrier 12a reengages a conveyor chain moving at a second speed. In addition, a third carrier 12c bumps into carrier 12b, disengaging carrier 12c just before carrier 12b begins moving across transfer track 52, pushed by dog 60. As the plurality of carriers 12 reach conveyor 30 a second spaced configuration is formed due to the second speed of conveyor 30 and the operating speed of the transfer 50. This process may continue until a desired number of workpieces have moved through a manufacturing center.

The foregoing detailed description is given primarily for clearness of understanding and no unnecessary limitations are to be understood therefrom for modifications will become obvious to those skilled in the art upon reading this disclosure and may be made without departing from the spirit of the invention and scope of the appended claims.

I claim:

1. A method of moving a workpiece carrier from a first conveyor to a second conveyor, comprising the steps of:
    operating a first conveyor system at a first speed;
    operating a second conveyor system at a second speed;
    operating a transfer station at said first speed; and,
    transferring at least one workpiece carrier from said first conveyor system to said second conveyor system.

2. The method of claim 1, said operating a transfer station including rotating a plurality of workpieces and positioning a plurality of workpiece carriers from one of an openpack configuration or a closepack configuration to the other of an openpack configuration or a closepack configuration.

3. The method of claim 1 including varying spacing of a plurality of workpiece carriers from a first spaced configuration to a second spaced configuration between said first conveyor system and said second conveyor system.

4. The method of claim 1 wherein said second speed is less than said first speed.

5. The method of claim 1 wherein said first speed is less than said second speed.

6. The method of claim 1, including moving one of said first conveyor or said second conveyor through a workstation.

7. The method of claim 1 said transferring including the step of engaging said at least one workpiece carrier with a pusher dog.

8. The method of claim 7, said pusher dog operating at said first speed and directing said at least one work piece carrier across said transfer station.

9. A method of transporting a workpiece carrier from a first conveyor to a second conveyor including the steps of:
    operating a first feed conveyor at a first speed;
    operating a second conveyor at a second speed;
    operating a transfer station at a speed at least equal to the feed conveyor;
    disengaging a workpiece carrier from said feed conveyor;
    forcing said workpiece carrier across said transfer station to said second conveyor;
    rotating a workpiece from one of an openpack configuration or a closepack configuration to the other of said openpack configuration or said closepack configuration along said transfer.

10. The method of claim 9 said operating a transfer including the step of engaging a workpiece carrier with a pusher dog and directing said at least one work piece carrier across said transfer station.

11. The method of claim 10, said pusher dog operating at said first speed.

12. The method of claim 9 further comprising the step of varying the spacing between a plurality of workpiece carriers from the feed conveyor to the second conveyor.

13. A method of transporting a workpiece carrier from a first conveyor to a second conveyor including the steps of:
    operating a first feed conveyor at a first speed;
    operating a second conveyor at a second speed;
    operating a transfer station at a speed at least equal to the first speed;
    disengaging a workpiece carrier from said feed conveyor;
    forcing said workpiece carrier across said transfer station to said second conveyor;
    rotating a workpiece from one of an openpack configuration or a closepack configuration to the other of said openpack configuration or said closepack configuration along said transfer;
    varying the spacing between a plurality of workpiece carriers from said feed conveyor to said second conveyor.

14. A multi-speed variable spacing conveyor system, comprising:
    at least one first conveyor;
    at least one second conveyor; and,
    at least one transfer station disposed between said at least one first conveyor and said at least one second conveyor and providing operable communication therebetween, said first and second conveyors comprising a substantially T-shaped track.

15. The multi-speed variable spacing conveyor system of claim 14 including a plurality of workpieces disposed on at least one of said first conveyor or said second conveyor.

16. The multi-speed variable spacing conveyor system of claim 14, said T-shaped track defined by three U-shaped channels formed in a T-shaped configuration.

17. The multi-speed variable spacing conveyor system of claim 14, said T-shaped track including a chain channel and a chain slidably disposed in said chain channel.

18. The multi-speed variable spacing conveyor system of claim 14, said transfer station including a structural steel support and a transfer track depending from said structural support.

19. The multi-speed variable spacing conveyor system of claim 18, said transfer station including at least two sprockets and a crossover chain disposed about said at least two sprockets.

20. The multi-speed variable spacing conveyor system of claim 19 further comprising at least one pusher dog connected to said crossover chain.

* * * * *